United States Patent
Ait Bouziad

(10) Patent No.: US 12,458,173 B2
(45) Date of Patent: Nov. 4, 2025

(54) METHOD FOR DISPENSING GROUND COFFEE

(71) Applicant: SOCIETE DES PRODUITS NESTLE S.A., Vevey (CH)

(72) Inventor: Youcef Ait Bouziad, Echandens (CH)

(73) Assignee: Société des Produits Nestlé S.A., Vevey (CH)

( * ) Notice: Subject to any disclaimer, the term of this patent is extended or adjusted under 35 U.S.C. 154(b) by 302 days.

(21) Appl. No.: 18/002,295

(22) PCT Filed: May 11, 2021

(86) PCT No.: PCT/EP2021/062385
§ 371 (c)(1),
(2) Date: Dec. 19, 2022

(87) PCT Pub. No.: WO2021/259548
PCT Pub. Date: Dec. 30, 2021

(65) Prior Publication Data
US 2023/0346166 A1  Nov. 2, 2023

(30) Foreign Application Priority Data
Jun. 22, 2020 (EP) .................................. 20181347

(51) Int. Cl.
*A47J 42/50* (2006.01)
*A23F 5/08* (2006.01)
(Continued)

(52) U.S. Cl.
CPC ................. *A47J 42/50* (2013.01); *A23F 5/08* (2013.01); *A47J 31/42* (2013.01); *A47J 42/08* (2013.01); *A47J 42/10* (2013.01); *A47J 42/44* (2013.01)

(58) Field of Classification Search
CPC .. A47J 42/50; A47J 42/08; A47J 42/10; A47J 42/44; A47J 31/42; A47J 2043/0733; A23F 5/08
See application file for complete search history.

(56) References Cited

U.S. PATENT DOCUMENTS 7,874,505 B1    1/2011  Lassota
9,532,682 B1 *  1/2017  Lassota ..................... B02C 7/14
(Continued)

FOREIGN PATENT DOCUMENTS

CH          713826      11/2018
CN        105916418      8/2016
(Continued)

OTHER PUBLICATIONS

Russian Office Action for Appl No. 2022133227/03 dated Sep. 12, 2024, 6 pages.

*Primary Examiner* — Mohammed S. Alawadi
(74) *Attorney, Agent, or Firm* — Thorpe North & Western, LLP

(57) ABSTRACT

The invention relates to a method for dispensing ground coffee for preparing a coffee beverage. The method comprises the steps of: providing a machine (110), which comprises one or more receptacles (13, 14) for storing one or different types of roasted coffee beans, one or more dosing devices (60, 70) for dispensing coffee beans, which are stored in the one or more receptacles (13, 14), and a grinder (30) for receiving coffee beans, which are dispensed by the one or more dosing devices (60, 70), the grinder (30) being configured to move into different grinding positions for different grinding degrees, respectively; setting up the grinder (30) so that the grinder (30) is in a specific grinding position; dispensing, with the one or more dosing devices (60, 70), a specific amount of coffee beans to the grinder (30) subsequent to the step of setting up the grinder (30); and (Continued)

grinding, with the grinder (30), said specific amount of coffee beans and, thus, dispensing the so ground coffee beans until the grinder (30) is free from coffee beans.

22 Claims, 5 Drawing Sheets

(51) Int. Cl.
*A47J 31/42* (2006.01)
*A47J 42/08* (2006.01)
*A47J 42/10* (2006.01)
*A47J 42/22* (2006.01)
*A47J 42/44* (2006.01)
*A47J 43/07* (2006.01)

(56) References Cited

U.S. PATENT DOCUMENTS

| | | | |
|---|---|---|---|
| 11,547,244 B2 * | 1/2023 | Deuber | A47J 42/18 |
| 2011/0256273 A1 * | 10/2011 | de Graaff | A47J 42/50 |
| | | | 426/106 |
| 2013/0133520 A1 | 5/2013 | Hulett et al. | |
| 2014/0123857 A1 * | 5/2014 | Rego | A47J 31/42 |
| | | | 99/280 |
| 2015/0135966 A1 * | 5/2015 | Hulett | G05B 15/02 |
| | | | 99/289 R |
| 2015/0157166 A1 * | 6/2015 | Van Os | A47J 42/50 |
| | | | 99/289 R |
| 2019/0357720 A1 * | 11/2019 | Abbiati | A47J 42/38 |
| 2021/0353093 A1 * | 11/2021 | Muheim | A47J 31/52 |

FOREIGN PATENT DOCUMENTS

| | | |
|---|---|---|
| CN | 110537854 | 12/2019 |
| EP | 2862487 | 4/2015 |
| EP | 3574811 | 12/2019 |
| JP | S61194595 A | 8/1986 |
| JP | S6467615 A | 3/1989 |
| JP | 2003310441 A | 11/2003 |
| JP | 2012502728 A | 2/2012 |
| JP | 2017500091 A | 1/2017 |
| JP | 2019030433 A | 2/2019 |
| JP | 2020006148 A | 1/2020 |
| RU | 2676257 C2 | 12/2018 |
| TW | 1619457 | 4/2018 |
| WO | 2012138327 | 10/2012 |
| WO | 2019076868 | 4/2019 |
| WO | 2019122397 | 6/2019 |

* cited by examiner

METHOD FOR DISPENSING GROUND COFFEE

CROSS REFERENCE TO RELATED APPLICATIONS

The present application is a National Stage of International Application No. PCT/EP2021/062385, filed on May 11, 2021, which claims priority to European Patent Application No. 20181347.4, filed on Jun. 22, 2020, the entire contents of which are being incorporated herein by reference.

FIELD OF THE INVENTION

The present invention relates to a method for dispensing ground coffee, in particular for preparing a coffee beverage.

TECHNICAL BACKGROUND

A system for dispensing ground coffee is typically used in a full automatic beverage preparation machine. The full automatic machine provides a full automatic process, starting with storing the roasted coffee beans and ending with the delivery of the coffee beverage into a cup. Usually, the coffee beans are stored in a receptacle, i.e. a canister, and are in direct contact with a grinder, which is provided for grinding the roasted coffee beans. The grinder is thus drown by coffee beans. Delivery of the ground (grinded) coffee may then be done volumetrically either by time or by number of turns of the grinder.

However, this process leads to two main problems. Firstly, storing of the coffee beans in the receptacle effects that the coffee beans age and, therefore, degrade. That is, the coffee beans as a natural product is subject to oxidation. The taste of oxidized coffee beans can be easily detected by the consumer. For example, and according to a sensory internal study, this oxidized taste can be detected when 80 micrograms of oxygen ($O_2$) are absorbed by 1 gram of coffee, which leads in terms of volumes ratio to 3% of oxygen/coffee or 15% of air/coffee. According to the Coffee Freshness handbook, first edition, published by the Specialty Coffee Association, in packaged coffee, oxygen even at very low levels (less than 2%) has been found to migrate into coffee and facilitate oxidation reactions. Moreover, research shows that certain types of aroma compounds in coffee begin to dissipate almost immediately after grinding, and the greatest rate of chemical freshness loss occurs in the first month of coffee storage, which may vary depending on the coffee blend, roast-degree or extraction technique. Carbon dioxide also affects extraction: espresso extraction parameters need to be adjusted in order to take into account how fresh the coffee is, as this increases the resistance to the water flow and affects the contact between the extraction water and coffee.

Secondly, an adjustment of the grinder setup for a specific coffee beverage cannot be carried out or is at least difficult to be carried out. This adjustment of the grinder setup in particular requires an adjustment of the grinder to grind coffee beans so that the delivered ground coffee beans has a grinding degree (i.e. granulometry, coarseness, or particle size), which is required by the desired coffee beverage. However, since the grinder is full of coffee beans, the coffee beans block a movement of the grinder for the adjustment of the grinder for grinding with a specific grinding degree. For this reason, full automatic machine use a grinder with only one grinding setup, i.e. only one grinding degree, for different beverages such as ristretto, espresso, lungo. This, however, leads to a compromise in quality of the delivered beverage, since different coffee beverages require, amongst others, different particle sizes. For example, an espresso requires a smaller particle size and, thus, a smaller grinding degree than a lungo in order to provide a well tasting coffee beverage. That is, in pressure extraction coffee machines (including full automatic machines), the flowrate is dependent on the coffee grinding (i.e. the particle size distribution): thinner grains are requested for espressos and ristretos which need a slower flow to extract the right amount of substance from the coffee bed for the size of the beverage. On the contrary, lungo coffees need coarser grain, leading to faster flows to extract the right amount of substance from the coffee bed for the "longer" size of the beverage without leading to over-extraction.

In general, the extraction yield is a parameter to be adjusted for preparing a well tasting coffee beverage. The extraction yield is the percentage by mass of coffee grounds that ends up dissolved in the brewed coffee. According to the SCAE (Speciality Coffee Association—Europe), it is desired to achieve an extraction yield of 18 to 22%, ideally 20%, of the coffee bed to obtain a balanced and, thus, well tasting coffee beverage from an organoleptic point of view. For this purpose, and to maintain a yield of 20%, the Barista adapts the particle size, i.e. granulometry, to the specific coffee beverage. Values bellow said recommended yield are considered as under-extraction, and values over said recommended yield are considered as over-extraction.

Therefore, it is an object of the present invention to provide a system for dispensing ground coffee into a beverage preparation machine and a method for dispensing ground coffee into a beverage preparation machine, which overcome the afore-mentioned drawbacks. That is, it is in particular an object of the present invention to provide a system and a method, which provide an improved automatic process for grinding coffee beans for different types of coffee beverage, without compromising the quality of the different types of coffee beverage.

These and other objects, which become apparent upon reading the following description, are solved by the subject matter of the independent claim. The dependent claims refer to preferred embodiments of the invention.

SUMMARY OF THE INVENTION

A system for dispensing ground coffee, in particular for preparing a coffee beverage, comprises: one or more receptacles for storing one or different types of roasted coffee beans, one or more dosing devices for dispensing coffee beans, which are stored in the one or more receptacles, and a grinder for receiving coffee beans, which are dispensed by the one or more dosing devices, in order to grind said coffee beans and subsequently dispense the so ground coffee beans, the grinder being configured to move into different grinding positions for different grinding degrees, respectively.

The one or more dosing devices are arranged between the one or more receptacles and the grinder such that the one or more dosing devices can (i.e. are able to) act as one or more retaining elements for retaining coffee beans inside of the one or more receptacles. Thereby, the one or more dosing devices act as retaining elements for dispensing coffee beans, which are stored in the one or more receptacles. In other words, the one or more dosing devices can switch between a retaining mode and a dispensing mode, wherein in the retaining mode, the one or more dosing devices act as the one or more retaining elements (i.e. the coffee beans stored in the one or more receptacles lie and/or are supported on the one or more dosing devices without being dispensed), and wherein in the dispensing mode, the one or more dosing devices are arranged for dispensing the coffee beans, which are stored in the one or more receptacles.

The system further comprises a control unit for controlling the one or more dosing devices and the grinder, wherein the control unit is configured to control one or more of the one or more dosing devices so that a specific amount of coffee beans is dispensed to the grinder, and to control the grinder so that the grinder grinds said specific amount of coffee beans and, thus, dispenses the so ground coffee beans until the grinder is free from coffee beans so that the grinder can subsequently be moved in one of the different grinding positions.

Therefore, when the specific amount or quantity of coffee beans is ground and, thus, delivered by the grinder, the grinder is always free from coffee beans. In the state of the grinder, in which the grinder is free from coffee beans, the grinder can thus be moved into a specific grinding position with a specific grinding degree in order to dispense ground coffee with a particle size, which is specifically provided for a certain or desired type of coffee beverage. Thus, the system and in particular the grinder does not provide only one particle size of ground coffee, but a plurality of different particle sizes (in particular servings of ground coffee particles, which have different volume moment means (De Brouckere Mean Diameter, D[4,3]), respectively) for a plurality of different coffee beverages. As such, the system does not compromise between different types of coffee beverages.

The system thus may facilitate that not only the type of coffee beans (origin, roasting level, etc.), a specific amount of ground coffee, a specific volume of water with a specific temperature, a specific pressure (drip, pressure, etc.), and an extraction time, but also a specific grinding degree, i.e. a specific particle size of the ground coffee, can be automatically set by the system. Therefore, the system can, based on a user request, also deliver a particle size of the ground coffee, which particle size is adapted for the coffee beverage to be prepared from the requested ground coffee. Consequently, there is no risk or at least a significantly reduced risk that the coffee beverage, which is to be prepared from the dispensed ground coffee, is under-extracted or over-extracted, thereby improving the quality of the coffee beverage.

The grinder may comprise two grinding elements, which are separated by a distance and relatively movable (with respect) to one another in order to grind the received coffee beans between the two grinding elements. In other words, the two grinding element may delimit a gap, in which the coffee beans can enter and subsequently be received for grinding. Thus, a very efficient grinding of the coffee beans is achieved. The two grinding elements, i.e. the gap, may also delimit an inlet for the entrance of coffee beans into the space between the two grinding elements, and an outlet, by way of which the ground coffee can be dispensed by the grinder. For the relative movement of the two grinding elements, e.g. a rotational movement around a rotational movement axis, only one or both of the grinding elements may move.

The grinder may be configured to vary said distance in order to move the grinding elements and thus the grinder between the different grinding positions. Thus, the grinder can be very easily moved between the different grinding positions, i.e. into a desired one of the different grinding positions.

Each of the one or more receptacles may be connected to a respective one of the one or more dosing devices, preferably such that each of the one or more receptacles and the respective dosing device can be removed as a whole unit. Thus, the system can be very easily produced and/or very easily maintained, in particular without sending coffee beans, which are stored in the container, to an outside of the receptacles during removing of the whole unit.

The system may further comprise a measuring unit for measuring the amount of coffee beans, dispensed by the one or more dosing devices, and configured to send signals to the control unit indicative of the measured amount of dispensed coffee beans. This helps to provide a feedback $100p$ for a very precise dosing of coffee beans.

Preferably, the measuring unit is part of the one or more dosing devices and/or is arranged in the one or more dosing devices. In other words, the one or more dosing devices may be also adapted for carrying out the functions of the measuring unit, i.e. the one or more dosing devices may be also adapted for measuring the amount of dispensed coffee beans. Thus, a very compact arrangement for both dispensing coffee beans and measuring the amount of dispensed coffee beans is provided. Further, the one or more dosing devices and the measuring unit can be moved together, i.e. as a whole unit. This improves the assembly and the maintenance of the one or more dosing devices and measuring unit. Alternatively, the measuring unit may be provided separate from the one or more dosing devices.

The measuring unit may be arranged to measure the volume and/or weight and/or number of the coffee beans, dispensed by the one or more dosing devices. The amount of coffee beans, dispensed by the one or more dosing devices, may thus be calculated based on the volume and/or weight and/or number of the coffee beans.

The system may comprise only one grinder. Therefore, a very simple and compact design of the machine is provided, in particular when only one grinder is provided for a plurality of dosing devices and/or a plurality of receptacles. Alternatively, the system may comprise a plurality of grinders, wherein each grinder is arranged for receiving coffee beans, dispensed by one or more of the dosing devices.

The system may further comprise one or more driving units, such as one or more motors, for moving the grinder, in particular the grinding elements, between the different grinding positions and/or for operating the grinder for grinding coffee beans, wherein the one or more driving units are preferably detachably connected to the grinder. For example, the system may comprise one driving unit for moving the grinder between the different grinding position, and another driving unit for operating the grinder for grinding coffee beans. If the system comprises a plurality of grinders, the detachable connection facilitates that one of the grinders can be detached or removed from the respective driving unit, while the process of grinding coffee beans with the respective other grinders is maintained. Thus, the system may be serviced and operated for dispensing ground coffee at the same time.

The grinder may be of a conical burr type or of a flat burr type.

The grinder may be adapted to grind the coffee beans with a constant and/or variable velocity (e.g. rotational speed). For example, based on the control input, in particular based on the type of coffee beverage, the grinder may adjust the velocity of the grinder for grinding. Additionally or alternatively, the grinder may be adapted to grind coffee beans for different types of coffee beverages with the same (constant) velocity.

The system may further comprise a further retaining element, wherein the further retaining element is arranged to force coffee beans, which are received by the grinder, towards the grinder, in particular into a gap delimited by the two grinding elements, in order to grind these coffee beans. Thus, this further retaining element prevents coffee beans from jumping away from the grinder. Further, the further retaining element facilitates that the specific amount of coffee beans is quickly ground by the grinder.

The control unit may be configured to receive presence signals indicative of a presence and non-presence of coffee beans received by the grinder and to control the grinder such that grinder operates to grind, in particular by relatively moving the two grinding elements to one another, at least until the control unit receives presence signals indicative of the non-presence of coffee beans received by the grinder. In other words, the state of the grinder, in which the grinder is free from coffee beans, can be identified based on the presence signals. The presence signals may be derived by the control unit itself (e.g. by evaluating parameters for operating the grinder) or may be provided from a means other than the control unit, e.g. sent by a presence sensor.

Preferably, the presence signals are based on a sensed force and/or torque for operating the grinder for grinding, in particular by relatively moving the grinding elements to one another, wherein the control unit receives presence signals indicative of the non-presence if the sensed force and/or torque falls below a defined threshold value. In other words, the force and/or torque is sensed for determining the end of the grinding process, which is effected by the grinder. Thus, a very low-cost solution for providing the presence signals, in particular without requiring additional sensors, is provided.

The control unit may be configured to receive a specific control input, wherein the control unit is configured to control, based on the specific control input, the grinder to move into one of the different grinding positions and/or to control, based on the specific control input, one or more of the dosing devices to dispense a specific amount of coffee beans. Therefore, the system can provide ground coffee, which is particularly well tailored for the respective request of the control input.

The control input may be a recipe, in particular a recipe for a coffee beverage to be prepared. The system may further comprise a user interface, which is functionally connected to the control unit, for inputting the control input.

Each of the one or more receptacles may be a tight container, preferably at least partly made of an oxygen barrier material. Thus, the coffee beans, which are stored in the receptacles, are prevented from degradation due to oxidation.

Each of the one or more dosing devices may be configured to act as a pump or as a reverse pump in order to dispense coffee beans. Hence, the one or more dosing devices facilitate a very precise dosing of coffee beans, which optionally can dispense coffee beans back into the respective receptacle.

The system may further comprise a weighing unit, wherein the weighing unit is arranged to measure the weight of the ground coffee, which is ground and dispensed by the grinder, wherein the weighing unit is configured to send signals to the control unit indicative of the measured weight of received ground coffee, wherein the control unit is preferably configured to control the grinder such that the grinder operates to grind, in particular by relatively moving the two grinding elements to one another, at least until the weight of the ground coffee, measured by the weighing unit, corresponds to the amount of the coffee beans, measured by the measuring unit. In other words, the weighing unit can help in identifying the state of the grinder, in which the grinder is free from (i.e. no retention or remainder of) coffee beans.

The system may further comprise a brewing unit for receiving the ground coffee beans, which are dispensed by the grinder, in order to brew a coffee beverage with the so received ground coffee beans.

According to the invention, a method for dispensing ground coffee for preparing a coffee beverage is provided. The description with respect to the system applies analogously to the method. The method comprises the steps of: providing a machine (e.g. according to the above-described system), which comprises one or more receptacles for storing one or different types of roasted coffee beans, one or more dosing devices for dispensing beans, which are stored in the one or more receptacles, and a grinder for receiving coffee beans, which are dispensed by the one or more dosing devices, the grinder being configured to move into different grinding positions for different grinding degrees, respectively; setting up the grinder so that the grinder is in a specific grinding position; dispensing, with the one or more dosing devices, a specific amount of coffee beans to the grinder subsequent to the step of setting up the grinder (i.e. the step of setting up the grinder is carried out before the step of dispensing); and grinding, with the grinder, said specific amount of coffee beans and, thus, dispensing the so ground beans until the grinder is free from coffee beans The method may further comprise the step of moving the grinder, preferably with a driving unit such as a motor, in one of the different grinding positions subsequent to the step of grinding.

The grinder may comprise two grinding elements, which are separated by a distance and relatively movable to one another in order to grind the received coffee beans between the two grinding elements.

The method may further comprise the step of varying said distance in order to move the grinding elements and thus the grinder between the different grinding positions.

The machine may comprise only one grinder.

The method may further comprise the step of detaching the grinder, such as by detaching the grinder from the driving unit.

The grinder may be of a conical burr type or of a flat burr type.

The grinder may grind the coffee beans with a constant and/or variable velocity.

The method may further comprise the steps of: sensing a presence of coffee beans received by the grinder, and operating the grinder for grinding at least during the sensing of the presence of the coffee beans, e.g. until a non-presence of coffee beans received by the grinder is sensed.

The method may further comprise the steps of: sensing a force and/or torque, which is applied for operating the grinder for grinding, and stopping the grinding if the sensed force and/or torque falls below a defined threshold value.

The method may further comprise the steps of: inputting a specific control input and moving the grinder into one of the different grinding positions based on said specific control input, and/or dispensing, with the one or more of the dosing devices, a specific amount of coffee beans based on said specific control input.

The control input may be a recipe, in particular a recipe for a coffee beverage to be prepared. The machine may further comprise a user interface for inputting the control input.

The method may further comprise the step of forcing, such as with a retaining element, coffee beans, which are received by grinder, towards the grinder, in particular into a gap delimited by the two grinding elements, in order to grind these coffee beans.

Each of the one or more receptacles may be connected to a respective one of the one or more dosing devices, wherein the method preferably further comprises the step of removing at least one of the one or more receptacles and the respective dosing device as a whole unit.

Each of the one or more receptacles may be a tight container, preferably at least partly made of an oxygen barrier material.

Each of the one or more dosing devices may be configured to act as a pump or as a reverse pump in order to dispense coffee beans.

The method may further comprise the steps of measuring, with a measuring unit, the amount of coffee beans, which are dispensed by the one or more dosing devices, and sending signals, with the measuring unit, indicative of the measured amount of dispensed coffee beans. The measuring unit may measure the volume and/or weight and/or number of the coffee beans, dispensed by the one or more dosing devices.

The method may further comprise the steps of: measuring, with a weighing unit, the weight of the ground coffee, which is ground and dispensed by the grinder, and sending signals, with the weighing unit, indicative of the measured weight of received ground coffee. Optionally, the method further comprises the step of: operating the grinder to grind, in particular by relatively moving the two grinding elements to one another, at least until the weight of the ground coffee, measured by the weighing unit, corresponds to the amount of the coffee beans, measured by the measuring unit.

The method may further comprise the step of receiving, by a brewing unit, ground coffee beans, which are dispensed by the grinder.

DESCRIPTION OF A PREFERRED EMBODIMENT

In the following, the invention is described exemplarily with reference to the enclosed figures, in which FIG. 1 is an exemplary coffee control brewing chart;

Figure 1:
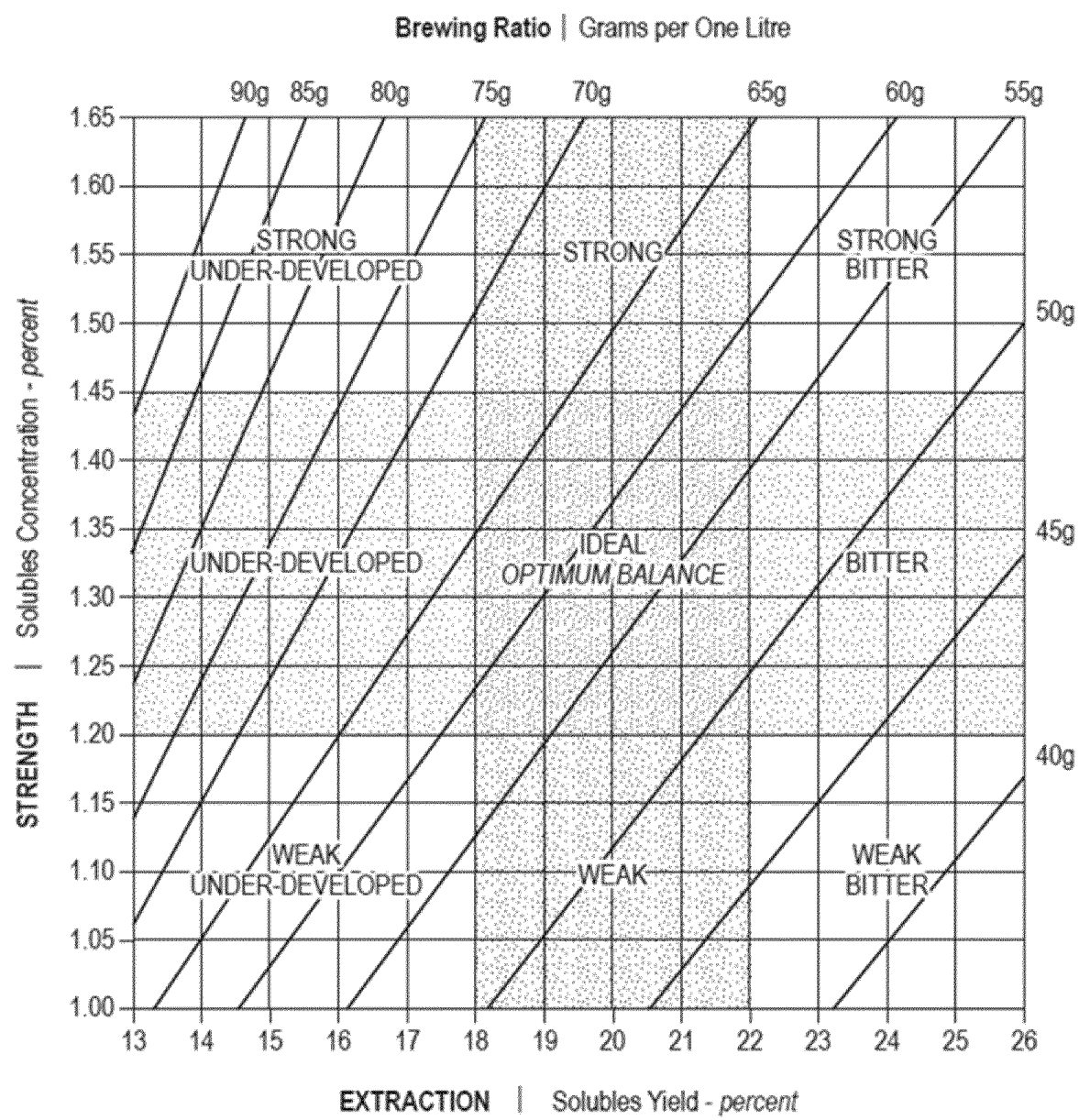

In FIG. 1, a coffee control brewing chart is shown. The y-axis shows the strength and means how many coffee solids end up dissolved in the water of the coffee beverage. The strength is expressed in total dissolved solids (TDS) and may be measured with a refractometer. The level of the strength may depend on a preference. For example, drip coffee may have the level of strength, i.e. the TDS, ideally in a range from 1.2% to 1.45%. The x-axis shows the extraction yield and means the percentage by mass of the coffee grounds that ends up dissolved in the brewed coffee. Ideally, the extraction yield is in the range from 18% to 22%. The extraction yield is dependent on, in particular, the type of the coffee (origin, roasting level, etc.), quantity of ground coffee per beverage, the volume of the beverage, the temperature of the brewing water, the extraction technique (pressure, drip, etc.), extraction time, and grind size of the ground coffee.

In FIG. 1, the ideal range of the TDS and the ideal range of the extraction yield overlap and form the box, which is in the center of the chart. This central box may represent the optimum cup of drip coffee. Depending on a preference, one may also have a coffee, which is in the ideal range of the extraction yield (from 18% to 22%), however with a level of strength (TDS), which is higher or lower than said ideal strength. For example, a coffee in the range of the ideal extraction yield and in a range from about 5% to 8% is a lungo, a coffee in the range of the ideal extraction yield and in a range from 8% to 12% is a an espresso, and a coffee in the range of the ideal extraction yield and in a range from 12% to 18% is a ristretto.

FIG. 1 also shows lines of constant brewing ratios, expressed in grams per one liter. That is, if the weight of ground coffee and the amount of water for preparing the respective coffee beverage is known, one can find the respective line in the chart. The TDS and the extraction yield will then be somewhere on the respective line, e.g. in the ideal extraction yield or outside of the ideal extraction yield. For example, for a given brewing ratio an extraction yield of the coffee beverage is achieved, which is below the ideal extraction yield. In order to achieve a coffee beverage, which has an identical brewing ratio but is in the ideal extraction yield, one may adapt parameters, which affect the extraction yield. As such, one may use the identical brewing ratio, i.e. the identical weight of ground coffee and amount of water as the previous (inferior) coffee beverage, however with the ground coffee having a smaller particle size. The TDS and extraction yield will then travel along the respective brewing ratio line and towards the ideal extraction yield. Additionally or alternatively, other parameters may be used for adjusting the extraction yield, such as the type of the coffee (origin, roasting level, etc.), the temperature of the brewing water, the extraction technique (pressure, drip, etc.), and/or extraction time, as explained above.

Figure 2:
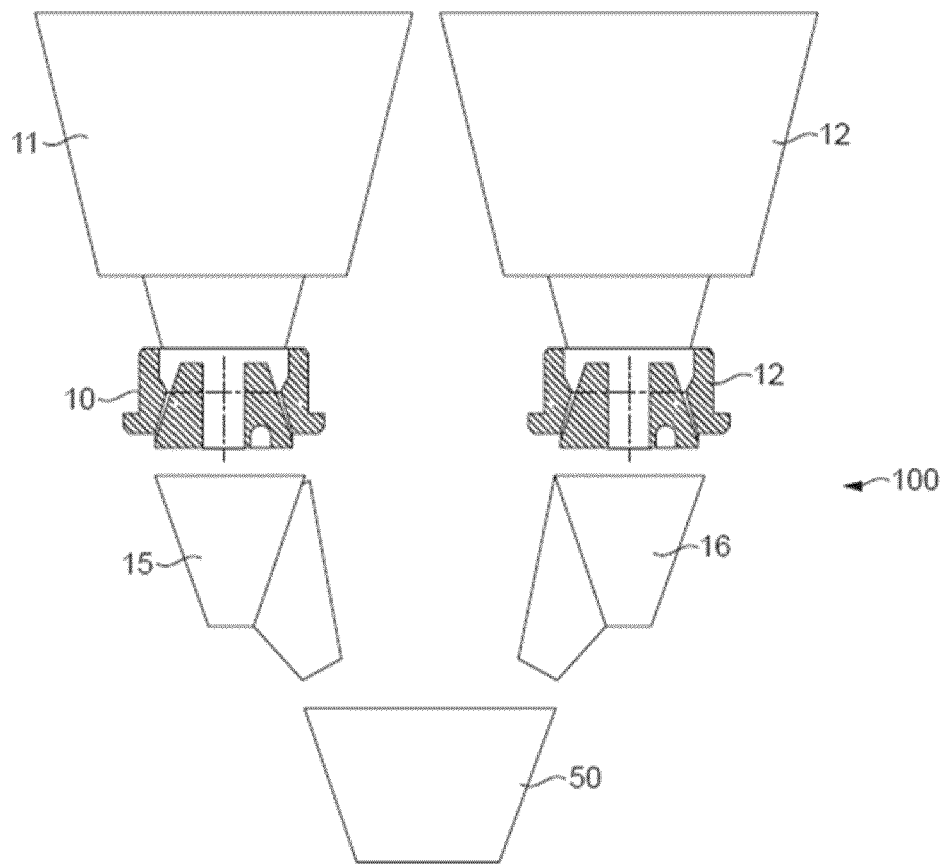
FIG. 2 is a schematic view of a system for dispensing ground coffee.

FIG. 2 shows a system or (full automatic) machine 100 for the preparation of a coffee beverage. The system 100 is in particular adapted for dispensing ground coffee into a beverage preparation machine for preparing a coffee beverage. The system 100 comprises receptacles 11, 12, which store one or different types of roasted coffee beans. The system boo further comprises grinders 10, 12, wherein the grinder 10 is arranged to receive and grind coffee beans, which are stored in the receptacle 11, and wherein the grinder 12 is arranged to receive and grind coffee beans, which are stored in the receptacle 12. The system 100 further comprises guiding elements 15, 16, which guide the ground coffee, which is ground by the respective grinder 10, 12, for a further processing in the beverage preparation machine. Before being sent to the beverage preparation machine, the ground coffee may be weighted by means of a weighing unit 50 so that it is ensured that the desired amount of ground coffee beans is extracted for the preparation of the coffee beverage.

In the system 100 according to FIG. 2, each of the grinders 10, 12 is connected to the respective receptacle 11, 12 in such a way that the respective grinder 10, 12 is drowned by coffee beans. That is, the coffee beans stored in the receptacles 11, 12 are always in direct contact with the respective grinders 10, 12. Due to this direct contact of the grinders 10, 12 with coffee beans, it is impossible or at least very difficult to adjust the respective grinder 10, 12 to adjust a grinding degree. As such, the ground coffee, which is delivered by each of the grinders 10, 12, has always the same grinding degree. The system 100 is therefore not able to deliver ground coffee with different particle sizes, respectively. Since the particle size has an effect on the extraction yield and thus quality of the coffee beverage, which is made from the respective ground coffee, the system 100 cannot be used for preparing a plurality of coffee beverages, which are respectively in the ideal extraction yield in order to have a good quality.

The system 100 therefore requires that each of the grinders 10, 12 is configured to provide a respective grinding degree in order to have a compromise between different particle sizes for different coffee beverages. For example, the grinder 10 may be adapted to deliver ground coffee only with a first particle size, such as a particle size for an espresso, wherein the grinder 12 is adapted to deliver ground coffee only with a second particle size, such as a particle size for a ristretto. If the system 100 therefore delivers ground coffee for the preparation of a different coffee beverage, e.g. a lungo, the delivered ground coffee, i.e. ground coffee with the first or second particle size, may have a particle size, which is too coarse (large) or too small than the required particle size, thereby resulting in an under-extraction or over-extraction and, therefore, in an inferior quality of the desired coffee beverage. Further, the plurality of grinders 10, 12 require a lot of space and an expensive production, resulting in a complex and costly system in addition to the delivery of coffee beverages with an inferior quality.

These disadvantages of the system 100 are overcome with the system 110 according to the invention. A preferred embodiment of the system 110 is exemplarily shown in FIGS. 3 and 4. The system 110 is adapted to dispense ground coffee (such as into a beverage preparation machine), for example for preparing a coffee beverage. The system 110 may be a machine or a part of a machine, wherein the machine is, for example, a (full automatic) beverage preparation machine. The system 110 or beverage preparation machine may be adapted to provide a full automatic process, starting with storing the roasted coffee beans and ending with the delivery of the coffee beverage into a cup. Except of a request of the user for dispensing a specific beverage, all process steps for preparing the coffee beverage from roasted coffee beans are thus automated by the system 110 or beverage preparation machine. The system 110 may be formed as a unit so that, in particular, all parts, which the system 110 comprises, can be displaced as a whole unit. The system 110 may comprise a housing for housing the respective parts of the system 110, in particular in order to form the unit of the system 110. The system 110 may be adapted to be placed in a household and/or on a tabletop.

The system 110 comprises a plurality, i.e. at least two receptacles 13, 14 for storing one or more different types of roasted coffee beans. That is, the receptacle 13 may store a first type of roasted coffee beans, wherein the receptacle 14 may store a second type of roasted coffee beans. The respective type of roasted coffee beans may be roasted dependent on a certain coffee beverage and/or may be of a specific origin. The system 110 is, however, not limited to a plurality of receptacles 13, 14, but may also comprise only one receptacle. The following description with respect to the plurality of receptacles 13, 14 therefore applies analogously to an embodiment, in which the system 110 comprises only one receptacle.

Each of the receptacles 13, 14 may be a tight container so that the roasted coffee beans, which are stored in the respective container 13, 14, maintain in an airtight environment. In order to provide the tight container, each of the receptacles 13, 14 may comprise a respective lid 21. The lid 21 is therefore arranged so that substantially no air or oxygen can travel by way of the opening of the respective receptacle 13, 14, which is closed by the lid 21, into the volume 22 of the respective receptacle 13, 14, in which volume 22 the coffee beans are stored. The lid 21 may comprise a pressure valve 26, so that by way of the pressure valve 26 air can escape from the receptacle 13, 14, in particular from the respective volume 22. The receptacles 13, 14 are therefore an air tight by means of the respective valve 26 so that the beans are stored in a tight atmosphere, preventing oxidation. In normal conditions, the valve 26 is closed and maintains the inner pressure inside the volume 22.

Each of the receptacles 13, 14 may have a variable volume comprising the volume receptacle 22 with the coffee beans stored therein. This volume receptacle 22 is, thus, configured to modify its volume in such a way that it adapts to the quantity of coffee beans that are stored inside of the respective receptacle 13, 14. Different possibilities are available for the configuration of such a variable volume container and volume receptacle 22. For example, the lid 21 may be a piston element, which acts as a passive element, which moves by gravity as coffee beans are moving out of the respective receptacle 13, 14. As these beans are dispensed, the lid 21 moves passively downwards in order to remove the headspace occupied by air and left by the delivered beans, thus adapting its volume to the volume, which is occupied by the remaining beans inside of the respective receptacle 13, 14. The lid 21 moves downwards by its own weight to compensate the volume loss left by the coffee beans (volume decreases as these beans have been delivered out of the respective receptacle 13, 14). The lid 21 may comprise a joint arranged between the lid 21 and the inner walls of respective receptacle 30, 40 respectively volume 22, when the lid 21 moves downwards, in order to minimize and avoid as much as possible the gas exchange (typically air) between the volume of coffee beans and the outer atmosphere. The coffee beans are therefore prevented from oxidization.

If the lid 21 is designed as a piston element, the valve 26 may be a threshold degassing valve equivalent to the weight of the piston element. The valve 26 then works when the respective receptacle 13, 14 is going to be filled with beans, and can work when the coffee beans degas. The lid 21, in the form of a piston element, is thus arranged to descend with the valve 26 open, thereby evacuating any remaining air inside the respective receptacle 13, 14. As such, tightness of the respective receptacle 30, 40, i.e. in the volume 22, is maintained while dispensing of coffee beans, which are stored in the respective receptacle 13, 14, takes place.

In normal conditions, the valve 26 is closed and maintains the inner pressure inside the volume 22. When the roasted coffee beans start degassing and the inner pressure in the volume 22 becomes higher than the weight of the lid 21, the valve 26 opens to release the pressure inside and to avoid that the lid 21, in the form of a piston element, moves upwards in the case the inner pressure becomes higher than the weight of the piston element. With this threshold pressure setting, it is ensured that no headspace or a minimum headspace exists in the volume 22, so that the coffee beans are isolated from the outer atmosphere (oxygen) as far as possible, and it is thus avoided that the piston element 21 (acting as a lid) moves upwards in the case of the beans quantity inside the volume 22 decrease.

The respective volume 22 of each of the receptacles 13, 14 is preferably formed having a constant section in the vertical axis (Z). Each of the receptacles 13, 14 may at least partly made of an oxygen barrier material. Preferably, each of the receptacles 13, 14 is made of a material, which is tight to moisture and air. The lid 21 may have the same (cross-) section as the (cross-) section of the volume 22. The lid 21 closes in a tight manner the upper part of the respective receptacle 13, 14, i.e. volume 22. The lid 21 may be provided with a (upper) handle so it can be removed from the respective receptacle 13, 14 in order to add coffee beans to the respective receptacle 13, 14, i.e. into the volume 22. In other examples (not represented in the figures), each of the receptacles 13, 14 may be configured as a sachet or pouch, which is made of a flexible material. Therefore, by shrinking of the sachet or pouch, the respective receptacle 13, 14 adapts its volume to the remaining volume occupied by the remaining coffee beans. The flexible sachet or pouch is made tight to air so that, when coffee beans are dispensed from it, air is sucked from the inside of its volume and so the flexible material will adapt to the remaining occupied volume.

The system 110 further comprises a plurality of dosing devices 60, 70, wherein each of the dosing devices 60, 70 is arranged to dispense (i.e. convey) coffee beans, which are stored in the receptacles 13, 14. The invention is, however, not limited to a specific number of dosing devices. For example, the system 110 may also comprise only one dosing device, which is arranged to dispense coffee beans, which are stored in only one receptacle or in a plurality of receptacles. If the system comprises only one dosing device, the description with respect to the dosing devices 60, 70 applies analogously to the only one dosing device. The one or more dosing devices 60, 70 in particular effect that always only the quantity or amount of coffee beans, which is needed, is dispensed. Thus, it is in particular prevented that too much or too little beans than required are removed from the one or more receptacles 13, 14.

Figure 3:
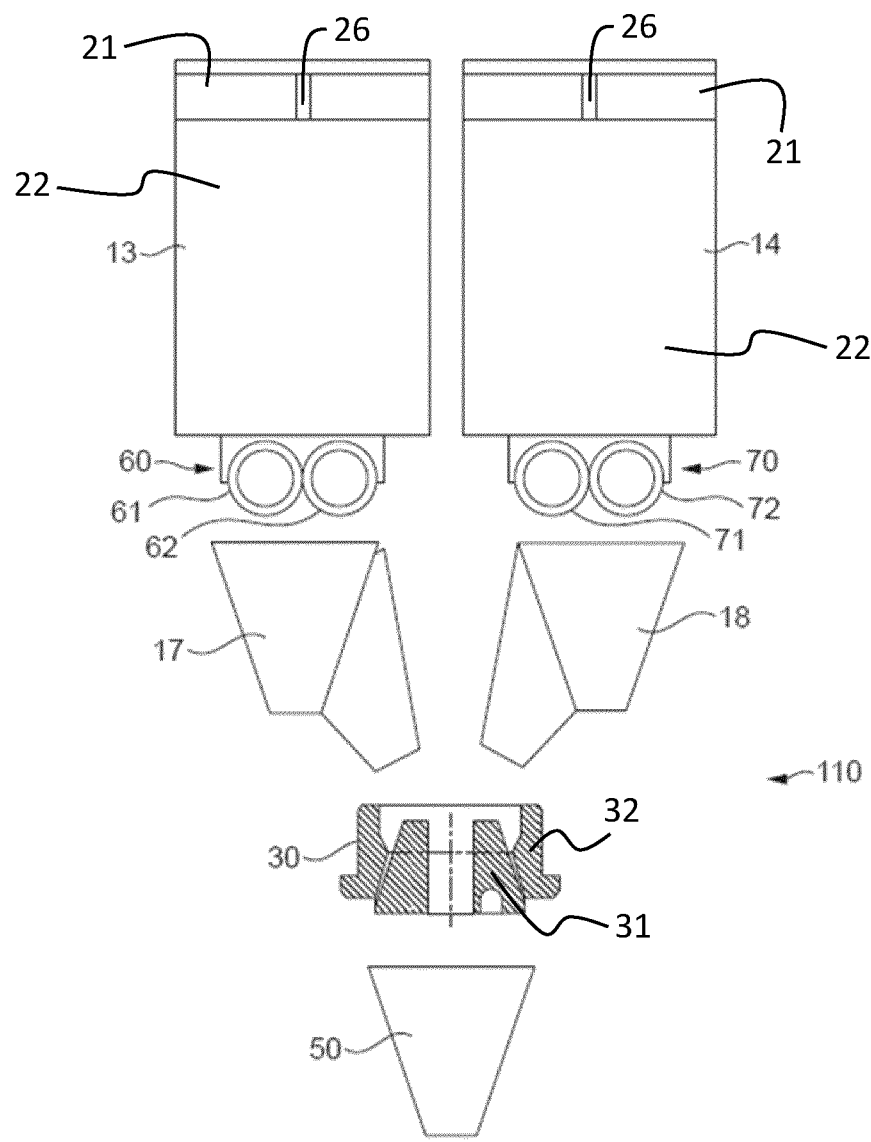
FIG. 3 is a schematic view of a system according to an embodiment of the invention.

The system 110 is not limited to a specific arrangement of the dosing devices 60, 70 as long as the dosing devices 60, 70 can dispense the coffee beans, which are stored in the receptacles 13, 14. Each of the dosing devices 60, 70 may be arranged to dispense coffee beans, which are stored in a respective one of the receptacles 13, 14. Thus, the dosing devices 6o may be arranged to dispense coffee beans, which are stored in the receptacle 13, and the dosing device 70 may be arranged to dispense coffee beans, which are stored in the receptacle 14. The one or more dosing devices 60, 70 are arranged such that the one or more dosing devices 60, 70 can act as one or more retaining elements for retaining coffee beans inside of the one or more receptacles 13, 14. Thus, the coffee beans, which are stored in the receptacles 13, 14, at least partly lie or are at least in part supported on the one or more dosing devices 60, 70. In a state, in which the one or more dosing devices 60, 70 do not dispense coffee beans, the one or more dosing devices 60, 70 therefore effect that coffee beans, which are stored in the receptacles 13, 14, are prevented from being removed (by gravity) from the receptacles 13, 14. Preferably, and as shown in FIG. 3, each of the dosing devices 60, 70 is arranged on a bottom part of a respective one of the receptacles 13, 14 and/or at the exit of the respective receptacle 13, 14. Thus, the coffee beans stored in each of the receptacles 13, 14 can move by gravity towards the respective dosing device 60, 70.

Each of the dosing devices 60, 70 is arranged such that a dispensing of coffee beans can be selectively blocked or stopped so that always only the specific or desired (i.e. requested) amount of coffee beans is dispensed by the dosing devices 60, 7o to the grinder 30. Each of the dosing devices 60, 70 is arranged to gently dose or dispense the roasted coffee beans from the respective receptacle 13, 14, so that the coffee beans are not subjected to any damage. As shown in FIG. 3, each of the dosing devices 60, 70 may be configured to act as a pump or as a reverse pump in order to dispense the coffee beans. In particular, each of the one or more dosing devices 60, 70 may comprise two counter-rotating cylinders 61, 62, 71, 72, which are arranged to rotate towards an inner center, which is between the cylinders 61, 62, 71, 72. Accordingly, the cylinders 61, 62, 71, 72 act as a pump to bring the coffee beans out of the receptacles 13, 14. Each of the dosing devices 60, 70 may the adapted to dispense coffee beans back into the respective receptacles 13, 14. This may be effected by rotating the two counter-rotating cylinders 61, 62, 71, 72 in a direction, which is opposite to the rotational movement for removing coffee beans from the respective receptacle 13, 14. The ability of dispensing coffee beans back into the respective receptacle 13, 14 effects a very precise dosing of coffee beans, so that, for example, not too much coffee beans are removed from the respective receptacle 13, 14. Further, it can be prevented that coffee beans remain between the cylinders, which would result in a degradation (oxidation) of the remaining coffee beans. In addition, it can be prevented that the cylinders are subject to wear such as deformation due to the coffee beans, which stay during long periods between the cylinders.

Each of the dosing devices 60, 70 may be designed in a tight manner so that, in particular during phases in which no coffee beans are dispensed by the dosing devices 60, 70, no air can enter into each of the receptacles 13, 14 by way of the respective dosing device 60, 70. The tightness of each of the dosing devices 60, 70 may be effected by a compressible material. For example, each of the cylinders 61, 62, 71, 72 may be at least in part made of a compressible and/or soft material, such as silicon, foam, or other compressible materials. Thus, the compressible material provides a tight outlet, thereby preventing air from entering the respective receptacle 13, 14 by way of the respective dosing device 60, 70. And since the compressible material of the cylinders 61, 62, 71, 72 preferably has a hardness which is lower than the hardness of the coffee beans to be dispensed, it can be also prevented that the cylinders 61, 62, 71, 72 damage the coffee beans to be dispensed.

In other examples, each of the dosing devices 60, 70 may comprise a respective pair of intermeshing gears for conveying the coffee beans out of and into the respective receptacle 13, 14. The pairs of intermeshing gears may be designed analogously to the cylinders 61, 62, 71, 72, so that the above description with respect to the cylinders 61, 62, 71, 72 applies analogously to the pairs of intermeshing gears. In another example, each of the dosing devices 60, 70 comprises only one gear, e.g. designed analogously to a cylinder as described above, wherein each of the dosing devices 60, 70 may comprise additional means, which cooperate with the only one gear in order to make the respective dosing device 60, 7o tight.

Each of the dosing devices 60, 70 may be configured to dispense coffee beans with a variable speed. For example, the respective dispensing process of each of the dosing devices 60, 70 may be divided in a beginning phase and a finalizing phase. As such, each of the dosing devices 60, 70 may be configured to (quickly) dispense coffee beans in the beginning phase with a first velocity, and to (slowly) dispense coffee beans in the finalizing phase with a second velocity, which is smaller than the first velocity. Thus, a very precise dosing with the dosing devices 60, 70 is effected, so that with the dosing devices 60, 70 the correct amount/ quantity of coffee beans can be dispensed. For example, in the beginning phase the cylinders 61, 62, 71, 72 can rotate quickly, wherein in the finalizing phase, the rotational speed of the cylinders is reduced in order to deliver the correct amount of the coffee beans. When each of the dosing devices 60, 70 comprises one or more gears, these explanations apply analogously.

In the system 110, each of the receptacles 13, 14 is connected to a respective one of the dosing devices 60, 70. Accordingly, the receptacle 13 is connected to the dosing device 60, and the receptacle 14 is connected to the dosing device 70. The connection between each of the dosing device 60, 70 and the respective receptacle 13, 14 may be effected by connecting or fastening elements. Preferably, each of the one or more receptacles 13, 14 and the respective dosing device 60, 70 are connected to one another in such a way that they can be removed (from the system 110, i.e. from the other parts of the system 110) as a whole unit. Thus, the system 110 can be efficiently produced and maintained. For example, each of the receptacles 13, 14 and the respective dosing device 60, 70 may be at least in part integrally formed with one another.

As shown in FIG. 3, the system 110 further comprises a grinder 30 for receiving coffee beans, which are dispensed by the dosing devices 60, 70. In the embodiment shown in FIG. 3, the system 110 comprises only one grinder, which is arranged to receive coffee beans, which are dispensed by the plurality of dosing devices 60, 70 and, thus, of the plurality of receptacles 13, 14. In other examples, the system 110 may also comprise a plurality of grinders 30. Each of the grinders 30 may then be provided for a respective one of the receptacles 13, 14 or for a plurality of receptacles 13, 14.

The grinder 30 is arranged to receive the coffee beans, which are dispensed by the dosing devices 60, 70, and each of the one or more dosing devices 60, 70 is arranged between the respective receptacle 13, 14 and the grinder 30. For example, the grinder 30 is arranged below the dosing devices 60, 70 so that the coffee beans, which are dispensed by the dosing devices 60, 70, move by gravity into the grinder 30. In other words, each of the one or more dosing devices 60, 70 is arranged before an entry of the grinder 30. The system 110 may comprise one or more guiding elements 17, 18 (a conduit, a tube, a rail, etc.), which are arranged to guide the coffee beans, which are dispensed by the dosing devices 60, 70, in such a way that these coffee beans can be received by the grinder 30. Accordingly, the guiding element 17 may be arranged such that coffee beans, which are dispensed by the dosing device 60, enter the guiding element 17 and are subsequently guided by the guiding element 17 in such a way that the coffee beans, which are dispensed by the guiding element 17, (directly) fall into the grinder 30. Correspondingly, the guiding element 18 may be arranged such that coffee beans, which are dispensed by the dosing device 70, enter the guiding element 18 and are subsequently guided by the guiding element 18 in such a way that the coffee beans, which are dispensed by the guiding element 18, (directly) fall into the grinder 30. Each of the guiding elements 17, 18 may be arranged between the grinder 30 and the respective one of the dosing devices 60, 70.

The grinder 30 is arranged or configured to grind the coffee beans, which are received by the grinder. Further, the grinder 30 is configured to subsequently dispense the so ground coffee. The dispensing of the ground coffee beans by the grinder 30 may be done by gravity only. The grinder 30 is therefore adapted to deliver the ground coffee only when the desired particle size of the ground coffee is achieved. That is, the grinder 30 may be adapted such that above a desired particle size ground coffee cannot be delivered by the grinder 30.

For example, the grinder 30 comprises two grinding elements 31, 32 (i.e. a first grinding element 31 and a second grinding element 32, e.g., a rotor and a stator, respectively), which are separated by a distance and relatively movable to one another in order to grind the received coffee beans between the two grinding elements 31, 32. One of the grinding elements 31, 32, such as the grinding element 32, may be stationary (i.e. a stator), while the respective other one of the grinding elements 31, 32, such as the grinding element 31, moves relative (with respect) to the one of the grinding elements 31, 32 (i.e. the grinding element 31 is a rotor). The relative movement may be a rotational movement and/or with respect to a specific (rotational) movement axis. The grinding elements 31, 32 may form or delimit a gap, which comprises an inlet and an outlet. By way of the inlet, (not yet ground) coffee beans can enter the gap in order to be arranged between the grinding elements 31, 32 for grinding. By way of the outlet, ground coffee, which is ground by the relatively moving grinding elements 31, 32, can exit the gap in order to be delivered by the grinder 30. The outlet may therefore have a size, which corresponds to the desired particle size of the ground coffee to be delivered by the grinder 30. As such, it can be prevented that ground coffee, which has a particle size above the size of said outlet, is delivered by the grinder 30. The gap, defined by the grinding elements 31, 31, may taper from the inlet to the outlet of the gap The grinder 30 is configured to move into different grinding positions for different grinding degrees, respectively. In each of the different grinding positions, the grinder 30 thus dispenses ground coffee beans with a respective particle size. Therefore, the grinder 30 is as such adapted to provide different particle sizes of ground coffee for different coffee beverage types or recipes, such as for an espresso, a ristretto, and a logo. In other words, a variation of the grinding degree (grind size) per coffee beverage is achieved with the grinder 30. Preferably, each of the different grinding positions corresponds to a respective grinding degree so that the grinder 30 can deliver ground coffee with two or more grinding degrees or particle sizes (volume moment mean diameter D[4,3] of the particles of the ground coffee, dispensed by the grinder 30), which are in the range from 50 μm to 1000 μm, such as the following grinding degrees (particle sizes): 100 μm (e.g., café turc), 200 μm (e.g., cafetière italienne), 300 μm (e.g., (machine) espresso, preferably 230-300 μm), 400 μm (e.g., (machine) espresso domestique (lungo preferably in the range from 320-360 μm), 500 μm (e.g., drip coffee "Café Filtre"), 600 μm (e.g., vacuum-verre), 700 μm (e.g., filtres en metal), 800 μm (e.g., french-press coffee), and 900 μm (e.g. for percolateurs).

In order to move the grinder 30 between the different grinding positions, the grinder 30 may be configured to vary the before-mentioned distance between the grinding elements 31, 32. That is, the gap may be delimited by a surface of the grinding element 31 and by a surface of the grinding element 32, wherein by moving the surface of the grinding element 31 away from or towards the surface of the grinding elements 32, the distance between the grinding elements can be varied in order to move the grinder 30 between the different grinding positions. One or more of the grinding elements 31, 32 may be arranged to move along a specific movement axis in order to vary said distance and, thus, adjust the gap formed by the grinding elements 31, 32. For example, the movement along this specific movement axis may be a translational movement, and/or the specific movement axis may be identical with or different to the (rotational) movement axis for relatively moving the two grinding elements 31, 32 for grinding the coffee beans between the two grinding elements 31, 32. The variation of the distance between the grinding elements 31, 32 effects that at the same time the size of the outlet of the gap, delimited by the grinding elements 31, 32, is adjusted/varied, in particular to have the size corresponding to the desired particle size or grinding degree of the respective grinding position.

The grinder 30 of the embodiment shown in FIG. 3 is of a conical burr type. The grinding element 31 is therefore substantially in the form of a cone. The space between the grinding elements 31, 32, i.e. the gap, is therefore delimited by the conical surface of the grinding elements 31 and a surface of the grinding element 32, which is preferably also in the form of a cone. In other examples, the grinder 30 may be of a flat burr type.

The system 110 may comprise one or more driving units, such as one or more motors, for moving the grinder 30, in particular the grinding elements 31, 32, between the different grinding positions and/or for operating the grinder 30 for grinding the coffee beans, in particular for relatively moving the grinding elements 31, 32 with respect to one another. The one or more driving units may be detachably connected to the grinder 30, in particular such that the grinder 30 can be removed without removing the one or more driving units. The detachable connection between the one or more driving units and the grinder 30 may be a quick mechanical connection, which allows a quick and easy detachment and, thus, unplugging of the grinder 30. The grinder 30 may be adapted to grind the coffee beans with a constant and/or variable velocity.

The system 110 may optionally comprise a retaining element (not shown), which is arranged to force coffee beans, which are received by the grinder 30, towards the grinder 30, in particular into the gap delimited by the two grinding elements 31, 32. Thus, the coffee beans, which are forced by the retaining element towards the grinder 30 and preferably into the gap, can be ground by the grinder 30. As such, the retaining element prevents that coffee beans jump out of the grinder 30, and thus the coffee beans can be efficiently ground by the grinder 30. The retaining element may be arranged such that the coffee beans are forced towards the grinder 30 by the gravitational force of the retaining element. Therefore, the retaining element 30 may be arranged on top of the coffee beans, which are received by the grinder 30. The retaining element may be dome-shaped.

The system 110 may further comprise a brewing unit (not shown), which is arranged to receive the ground coffee beans, which are dispensed by the grinder 30. Accordingly, the brewing unit is adapted to brew a coffee beverage with the so received ground coffee beans. The brewing unit thus comprises, in particular, an extraction unit. That is, the brewing unit may comprise a receptacle, in which the ground coffee, dispensed by the grinder 30, is received, and in which hot water, in particular with a defined temperature and/or a defined pressure and/or a defined flow rate, can enter in order to come into contact with the received ground coffee beans in order to effect the coffee extraction for the preparation of the coffee beverage. The brewing unit may be configured to deliver the coffee beverage, which is made from the ground coffee, which is received by the brewing unit. The brewing unit may deliver the coffee beverage into a cup. That is, the brewing unit is also configured to discharge the coffee beverage, which comprises the soluble flavors or particles, which are dissolved in the water from the ground coffee during the coffee extraction. The brewing unit may be arranged such that the ground coffee, dispensed by the grinder 30, is directly or indirectly dispensed into the brewing unit by gravity. For example, the brewing unit is arranged below, i.e. at the exit of, the grinder 30. With the system 110 comprising the brewing unit, the system 110 may be a beverage preparation machine.

Figure 4:
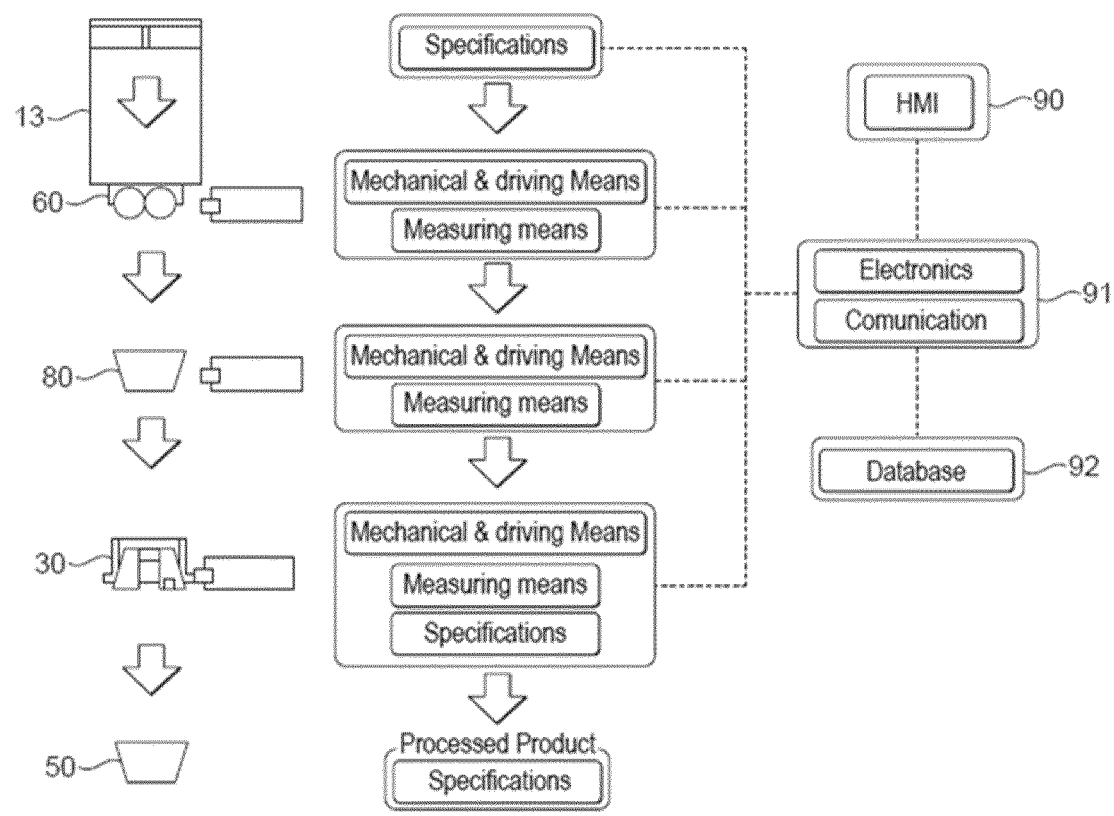
FIG. 4 is a schematic view of a system according to an embodiment of the invention.

As shown in FIG. 4, the system 110 further comprises a control unit 91 for controlling at least the dosing devices 60, 70 and the grinder 30. The control unit 91 is therefore functionally connected with at least the dosing devices 60, 70 and the grinder 30 for controlling them accordingly. The control unit 91 is an electronic control unit, in particular comprising a data carrier, a processor, and a communication interface. The control unit 91 is configured to control the dosing devices 60, 70 so that the dosing devices 60, 70 dispense a specific amount (e.g. weight) of coffee beans to the grinder 30. The control unit 91 is therefore configured to send signals to the dosing devices 60, 70, which are indicative of the required amount of coffee beans to be dispensed by the dosing devices 60, 70 to the grinder 30. The control unit 91 is preferably configured to control the speed of the dosing with the dosing devices 60, 70. For example, the control unit 91 may control only one of the dosing devices 60, 70 so that a specific amount of coffee beans of only the respective receptacle 13, 14 is dispensed the grinder 30. The control unit 91 may also be configured to control the dosing devices 60, 70 in such a way that a specific mix (i.e. blend) of coffee beans from the receptacles 13, 14 is dispensed by the dosing devices 60, 70 to the grinder 30 so that the specific amount of coffee beans corresponds to this specific mix of coffee beans. The specific mix of coffee beans may be a ratio of coffee beans from one of the receptacles 13, 14 to coffee beans of the respective other one of the receptacles 13, 14.

For a precise control of the dosing devices 60, 70 to dispense the specific amount of coffee beans, the system 110 may comprise a measuring unit 80, which is arranged to measure the amount of coffee beans, which are dispensed by the dosing devices 60, 70. The measuring unit 80 may be arranged between the one or more dosing devices 60, 70 and the grinder 30, and/or may be arranged at the exit of the one or more dosing devices 60, 70 and/or at the entry of the grinder 30. The system 110 may comprise only one measuring unit 80 for a plurality of dosing devices. Alternatively, the system 110 may also comprise a plurality of measuring units 80, each measuring unit 80 being arranged for a respective one of the dosing devices 60, 70. The measuring unit 80 is further configured to send signals to the control unit 91, which are indicative of the amount of dispensed coffee beans, measured by the measuring unit 80. Therefore, the control unit 91 may control the dosing devices 60, 70 to stop dispensing of coffee beans by the dosing devices 60, 70 when the measured amount of dispensed coffee beans corresponds to the specific (desired) amount of coffee beans.

The measuring unit 80 may be configured to measure the amount of coffee beans, dispensed by the dosing devices 60, 70, by measuring the weight of the coffee beans, which are dispensed by the dosing devices 60, 70. The measuring unit 80 may therefore be a weighing unit. There may be also other ways for measuring the amount of coffee beans, dispensed by the dosing devices 60, 70. For example, the measuring unit 80 may be configured to measure the volume of the coffee beans, dispensed by the dosing devices 60, 70. As such, the measuring unit 80 may send signals to the control unit 91 indicative of the measured volume of dispensed coffee beans, wherein the control unit 91 multiplies this volume of dispensed coffee beans with a specific value (i.e. a constant, e.g. expressed in grams per volume) in order to calculate the amount of coffee beans (e.g. a weight), dispensed by the dosing devices 60, 70. Additionally or alternatively, the measuring unit 80 may be configured to measure the number of coffee beans, which are dispensed by the dosing devices 60, 70. For example, the measuring unit 80 may measure the number of coffee beans by measuring the number of rotations of the rotating cylinders 61, 62, 71, 72. The measuring unit 80 may then send signals to the control unit 91 indicative of the measured number of dispensed coffee beans, wherein the control unit 91 multiplies this number of dispensed coffee beans with a specific value (i.e. a constant, e.g. expressed in grams per coffee beans) in order to calculate the amount of coffee beans (e.g. a weight), dispensed by the dosing devices 60, 70.

In general, the measuring unit 80 may be configured to measure the amount of dispensed coffee beans in a contactless or contacting manner. The measuring unit 80 may be configured to measure the amount of coffee beans, dispensed by the dosing devices 60, 70, with mechanical and/or driving means, in particular with a receptacle for receiving the coffee beans, dispensed by the dosing devices 60, 70. The receptacle may be also designed to dispense the coffee beans, when the measuring unit 80 finished the measurement of the amount of coffee beans. Additionally or alternatively, the measuring unit 80 may comprise electronic and/or optical means for measuring the amount of coffee beans, dispensed by dosing devices 60, 70.

Preferably, the measuring unit 80 is part of the one or more dosing devices 60, 70 and/or is arranged in the one or more dosing devices 60, 70. In other words, each of the one or more dosing devices 60, 70 may be integrally provided, i.e. as a unit, with a respective measuring unit 80. Therefore, each of the one or more dosing devices 60, 70 may have multiple functions, i.e. at least a double function, namely at least dispensing coffee beans and measuring the amount (e.g. weight) of dispensed coffee beans. With such a configuration, the dosing devices 60, 70 and the measuring unit 80 can be also arranged without requiring much space. For example, each of the dosing devices 60, 70 comprises a housing, in which, for example, functional parts for dispensing coffee beans with the respective dosing device are arranged, wherein the respective measuring unit 80 is arranged in this housing.

The control unit 91 is further configured to control the grinder 30 so that the grinder 30 grinds said specific amount of coffee beans, which is received by the grinder 30. Subsequently, the so ground coffee beans are dispensed by the grinder 30. That is, the control unit 91 is configured to control a force and/or torque, which operates the grinder 30 for grinding the coffee beans. For example, the control unit 91 is functionally connected to one of the driving units in order to control this driving unit to transmit a force and/or torque for operating the grinder 30, in particular the grinding elements 21, 32, for grinding, in particular such that the grinder 30 grinds at a specific (rotational) speed and/or with a specific (rotational) speed profile.

The control unit 91 is configured to control the grinder 30 so that the grinder 30 grinds said specific amount of coffee beans and, thus, dispenses the so ground beans until the grinder 30 is free from coffee beans. For example, the control unit 91 may receive signals indicative of the specific amount of coffee beans, which is dispensed by the dosing devices 60, 70 to the grinder 30, and control the grinder 30 in order to grind this specific amount of coffee beans until a specific time, which is linked in the control unit 91 to the specific amount of coffee beans (e.g. in a lookup table) and/or which is based on the specific amount of coffee beans, is lapsed. This specific time then has a duration, which is at least sufficient to grind the respective specific amount of coffee beans.

Preferably, the state of the grinder 30, in which the grinder 30 is free from coffee beans, is determined by the control unit 91 on the base of presence signals indicative of a presence (i.e. coffee beans are received by the grinder 30) and non-presence (i.e. no coffee beans are received by the grinder 30) of coffee beans received by the grinder 30. Accordingly, the control unit 91 is configured to receive these presence signals and control the grinder 30 in order to operate for grinding based on these presence signals. The control unit 91 then controls the grinder 30 in such a way that the grinder 30 operates to grind (e.g. the two grinding elements 31, 32 are relatively moving to one another) at least until the control unit 91 receives presence signals indicative of the non-presence of coffee beans received by the grinder 30. In other words, at least as long as the control unit 91 receives presence signals indicative of the presence of coffee beans received by the grinder 30, the control unit 91 controls the grinder 30 for operating to grind. The control unit 91 may be configured to control the grinder 30 to stop its operation to grind immediately after receiving the first presence signal indicative of the non-presence of coffee beans received by the grinder 30. However, the control unit 91 may also control the grinder 30 such that the grinder 30 maintains the operation to grind for a specific time after the reception of the first presence signal indicative of the non-presence of coffee beans received by the grinder 30.

The presence signals may be based on a sensed force and/or torque for operating the grinder 30 for grinding. For example, the grinder 30, such as its driving unit for operating the grinder 30 for grinding the coffee beans, may send signals to the control unit 91, which are indicative of the actual force and/or torque (e.g. sensed by a force and/or torque measuring device functionally connected to the control unit 91), which is used for operating the grinder 30 in order to grind the coffee beans. These signals may be derived from a (electrical) current for applying the force and/or torque, in particular for operating the driving unit. Since this force and/or torque is dependent on the frictional force, i.e. the grinding force, between the grinder 30 and the coffee beans to grind, this force and/or torque will vary dependent on the presence of coffee beans, which are received by the grinder 30 for grinding. Thus, the control unit 91 may include a defined threshold value so that the control unit 91 receives presence signals indicative of the non-presence if the sensed force and/or torque is below this defined threshold value. In other words, since the control unit 91 determines that the sensed force and/or torque is below the defined threshold value, the controller 91 determines that the grinder 30 is free from coffee beans. Additionally or alternatively, the presence signals may be sent by a presence sensor, which is arranged to detect the presence and non-presence of coffee beans, which are received by the grinder 30. For example, the presence sensor comprises mechanical and/or electronic and/or optical means in order to detect the presence and non-presence of coffee beans received by the grinder 30.

When the grinder 30 is free from coffee beans, the grinder 30 can subsequently be setup, i.e. in particular moved into one of the different grinding positions. In this state of the grinder 30, there are no coffee beans, which could block a movement of the grinder 30 for moving the grinder 30 in one of the different grinding positions. In particular, when the grinder 30 is free from coffee beans, the whole specific amount of coffee beans, dispensed by the one or more dosing devices 60, 70, is ground and delivered by the grinder 30. Thus, there is in particular no coffee bean between the two grinding elements 31, 32. Accordingly, the grinder 30 can be easily, i.e. without any blocking, moved into another grinding position for grinding coffee beans to deliver ground coffee with another grinding degree, i.e. another particle size. When the grinder 30 is moved into the other grinding position, i.e. when the grinder 30 has finished its movement of moving from the previous grinding position to the other grinding position, the control unit 91 controls, preferably immediately after the grinder 30 arrived in the other grinding position, the one or more of the dosing devices 60, 70 to dispense a specific amount of coffee beans to the grinder 30, which amount is specifically for the respective particle size (e.g. a certain type and amount (e.g. one or more cups) of a coffee beverage requires a specific particle size and a corresponding amount of coffee beans and, thus, ground coffee)

When the system 110 is shut down or the grinder 30 is removed from the system, e.g. for cleaning, the setup of the grinder 30 may have been undesirably changed. For this reason, the grinder 30 may have a zero value initialization that is set up at each change in the set-up of the grinder 30 or system 110 and/or at the start (powering up) of the system 110 and/or on a regular time basis. In particular, the control unit 91 may be configured to calibrate the grinder 30 always when the system 110 is powered up. The grinder 30 may have a zero position, wherein every grinding position is set based on this zero position. For example, the grinder 30 is in the zero position when the grinding elements 31, 32 touch one another. Thus, each grinding position then corresponds to a specific distance between the grinding elements 31, 32. The zero position may be detected by measuring, e.g. with the control unit 91, the force and/or torque, which is applied to the grinder 30 for being operated to grind. Thus, when the grinder 30 does not grind any coffee beans and the force and/or torque exceeds a defined threshold value, the control unit 91 detects that the zero position of the grinder 30 is reached. As the current for operating the grinder 30 for grinding is dependent on the respective force and/or torque of the grinder 30 for grinding, the control unit 91 may also detect that the zero position is reached when the said current exceeds a defined threshold value. Subsequently, the control unit 91 may set the respective grinding position of the grinder 30 based on this zero position, such as by moving the grinding elements 31, 32 to be separated by a specific distance.

As shown in FIGS. 3 and 4, the system 110 may further comprise a weighing unit 50 (e.g. a balance or scale). The weighing unit 50 is arranged to measure the weight of the ground coffee, which is ground and dispensed by the grinder 30. Therefore, the weighing unit 50 may be arranged such that ground coffee, which is dispensed by the grinder, may move (e.g. by gravity) into the weighing unit 50. If the brewing unit is present, the weighing unit 50 may be arranged such that the weighing unit 50 dispenses the ground coffee beans (e.g. by gravity) to the brewing unit subsequently to measuring the weight of the ground coffee with the weighing unit 50. In other words, the weighing unit 50 may be arranged between the grinder 30 and the brewing unit. The weighing unit 50 may comprise mechanical means (e.g. a receptacle) and/or electronic and/or optical means for measuring the weight of the ground coffee, which is ground and dispensed by the grinder 30. The weighing unit 50 is further configured to send signals to the control unit 91 indicative of the measured weight of the ground coffee, received by the weighing unit 50.

The weighing unit 50 may be arranged for the detection of the state of the grinder 30, in which the grinder 30 is free from coffee beans. More specifically, the control unit 91 may be configured to compare the weight of the ground coffee, measured by the weighing unit 50, with the weight of the coffee beans, measured by the measuring unit 80. If the weight of the ground coffee, measured by the weighing unit 50, essentially corresponds (e.g. with a tolerance of 1-5%) to the weight of the coffee beans, measured by the measuring unit 80, the control unit 91 detects that the grinder 30 is in the state, in which the grinder 30 is free from coffee beans. This because substantially the whole specific amount of coffee beans, dispensed by the dosing devices 60, 70, has been ground and dispensed by the grinder 30. In other words, the control unit 91 is configured to control the grinder 30 such that the grinder 30 operates to grind (e.g. the two grinding elements 31, 32 are relatively moving to one another) at least until the weight of the ground coffee, measured by the weighing unit, corresponds to the amount of coffee beans, measured by the measuring unit 80.

The control unit 91 may be configured to receive a specific control input, which is, for example, a recipe, in particular a recipe for a certain type of coffee beverage to be prepared, and/or a dosing parameter or quantity (e.g. weight) of ground coffee, and/or brewing parameters, and/or grinding specifications (particle size, coarseness, etc.). The system 110 may further comprise a user interface 90 (HMI), e.g. a touch sensitive element such as a touchscreen and/or a button, which is functionally connected to the control unit 91 for inputting the control input. Additionally or alternatively, the control input may be sent or derived from the receptacles 13, 14 so that, for example, the control input is based on the respectively stored coffee beans. Each of the one or more receptacles 13, 14 may comprise an identification means, which (electronically) stores the control input. Based on the specific control input, the control unit 91 may control at least the grinder 30 and/or one or more of the dosing devices 60, 70 in a specific manner. For example, the control unit 91 may be configured to control the grinder 30 to move, based on the specific control input, into one of the different grinding positions. For instance, a user of the system 100 may request an espresso by way of the user interface 90. The control unit 91 will then subsequently control the grinder 30 to move into a grinding position, which provides a grinding degree for providing the required particle size of ground coffee for preparing the espresso. Additionally or alternatively, the control unit 91 may be configured to control one or more of the dosing devices 60, 70 to dispense, based on the control input, a specific amount of coffee beans. For example, the control input relates to an espresso, wherein the control unit 91 will then control the dosing devices 60, 70 in order to dispense a specific amount (e.g. weight) and/or type (e.g. roasting level and/or origin) and/or blend (e.g. a specific ratio of coffee beans of receptacle 13 to coffee beans of receptacle 14) of coffee beans to the grinder 30.

As shown in FIG. 4, the control unit 91 may be functionally connected to a database 92. The database 92 may comprise control parameters for different types (i.e. recipes) of coffee beverages. Based on the control input, the control unit 91 may receive the control parameters from the database 92 for a particular type of coffee beverage. Based on these control parameters, the control unit 91 then accordingly controls components of the system 110, in particular the grinder 30 and/or the dosing devices 60, 70. The database 92 may be provided in the system or machine 110 and/or may be provided remotely, e.g. on a server and/or in the internet.

Figure 5:
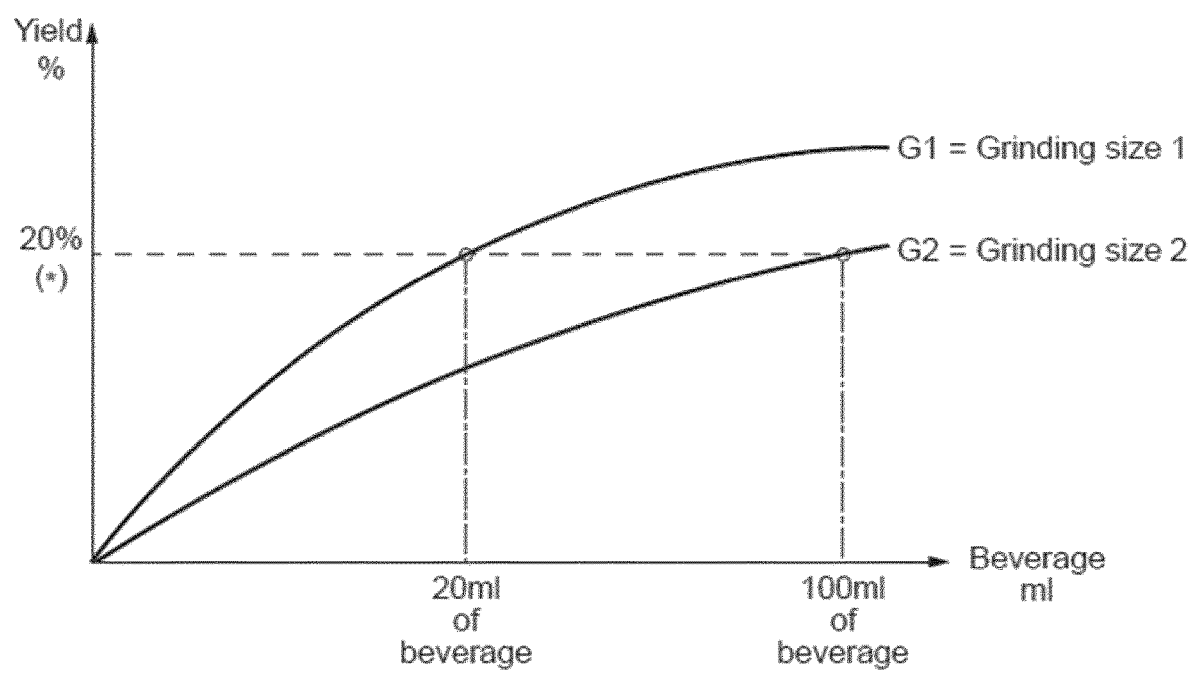
FIG. 5 is a chart exemplarily showing the extraction yield of different coffee beverages, which can be prepared with a system according to an embodiment of the invention.

FIG. 5 shows an exemplary chart of extraction yields (see y-axis), which can be achieved with the system 110 for different coffee beverages (see x-axis). As apparent from this figure, since the system 110, i.e. the grinder 30, is adapted to move between different grinding positions and, thus, to provide at least the different grinding sizes (or particle sized) G1, G2 of ground coffee, the system 110 is able to provide an ideal extraction yield (in FIG. 5: 20%) for different types of beverages. For example, a system, which could only provide the grinding size G2, would deliver a coffee beverage, which is under-extracted (i.e. below the extraction yield of 20%), if a user of this system requests a beverage with 20 mL, e.g. an espresso. The system 110 according to the invention, however, facilitates that based on the requested type of coffee beverage the grinding size is adapted, i.e. the grinder 30 moves into the respective grinding position. Therefore, instead of maintaining in only one grinding position for providing the grinding size G2, the grinder 30 of the system 110 will move, before the required amount of coffee beans is dispensed to the grinder 30, from the grinding position for the grinding size G2 into the grinding position for the grinding size G1, if a user of the system 110 requests a beverage with 20 mL. The so dispensed coffee beverage will then have an ideal extraction yield (here: 20%).

Similarly, if the grinder 30 is in the grinding position for delivering ground coffee with the grinding size G1 and a user of the system 110 requests a coffee beverage with 100 mL, e.g. a lungo, the grinder 30 will, instead of maintaining in the grinding positions for providing the grinding size G1, move into the grinding position for dispensing the grinding size G2. The so dispensed coffee beverage will then also have an ideal extraction yield (here: 20%) instead of being over extracted, if the system could only provide the grinding size G1.

According to a second object, the invention relates to a method for dispensing ground coffee, in particular for preparing a coffee beverage from the ground coffee. The method of the invention comprises the following steps:

providing a machine 110 (e.g. the above described system 110 as a machine), which comprises one or more receptacles 13, 14 (such as the receptacles 13, 14 as described above) for storing one or different types of roasted coffee beans, one or more dosing devices 60, 70 for dispensing beans (such as the dosing devices 60, 70 as described above), which are stored in the one or more receptacles 13, 14, and a grinder 30 (such as the grinder 30 as described above) for receiving coffee beans, which are dispensed by the one or more dosing devices 60, 70, the grinder 30 being configured to move into different grinding positions for different grinding degrees, respectively, setting up the grinder 30 so that the grinder 30 is in a specific grinding position, dispensing, with the one or more dosing devices 60, 70, a specific amount of coffee beans to the grinder 30 subsequent to the step of setting up the grinder 30, and grinding, with the grinder 30, said specific amount of coffee beans and, thus, dispensing the so ground beans until the grinder 30 is free from coffee beans It should be clear to a skilled person that the embodiments shown in the figures are only preferred embodiments, but that, however, also other designs of a system 110 can be used.

The invention claimed is:

1. A method for dispensing ground coffee for preparing a coffee beverage, the method comprising:
providing a machine, which comprises one or more receptacles for storing one or different types of roasted coffee beans, one or more dosing devices each including two counter-rotating cylinders arranged to rotate towards an inner center for dispensing the coffee beans from the one or more receptacles to a location between the two counter-rotating cylinders, wherein the two counter-rotating cylinders are at least in part made of a compressible or soft material having a hardness less than a hardness of the coffee beans, wherein the compressible or soft material provides a tight outlet that prevents air from entering the one or more receptacles, wherein each of the one or more dosing devices is configured to act as a pump or as a reverse pump in dispensing the coffee beans, and a grinder for receiving the coffee beans, which are dispensed by the one or more dosing devices, the grinder being configured to move into different grinding positions for different grinding degrees, respectively,
setting up the grinder so that the grinder is in a specific grinding position,
dispensing, with the one or more dosing devices, a specific amount of the coffee beans to the grinder subsequent to the setting up of the grinder, and
grinding, with the grinder, said specific amount of the coffee beans and, thus, dispensing the ground coffee beans until the grinder is free from coffee beans.

2. The method according to claim 1, further comprising moving the grinder in one of the different grinding positions subsequent to the grinding.

3. The method according to claim 1, wherein the grinder comprises two grinding elements, which are separated by a distance and relatively movable to one another in order to grind the coffee beans between the two grinding elements.

4. The method according to claim 3, further comprising varying said distance in order to move the grinding elements and thus the grinder between the different grinding positions.

5. The method according to claim 1, wherein the grinder of the machine comprises only one grinder.

6. The method according to claim 1, further comprising detaching the grinder from the driving unit.

7. The method according to claim 1, wherein the grinder is of a conical burr type.

8. The method according to claim 1, wherein the grinder grinds the coffee beans with a constant and/or variable velocity.

9. The method according to claim 1, further comprising:
sensing a presence of the coffee beans received by the grinder and
operating the grinder for grinding at least during the sensing of the presence of the coffee beans.

10. The method according to claim 9, further comprising:
sensing a force and/or torque, which is applied for operating the grinder for grinding, and
stopping the grinding if the sensed force and/or torque falls below a defined threshold value.

11. The method according to claim 1, further comprising:
inputting a specific control input,
moving the grinder into one of the different grinding positions based on said specific control input, and
dispensing, with the one or more of the dosing devices, the specific amount of the coffee beans based on said specific control input.

12. The method according to claim 11, wherein the specific control input is a recipe for the coffee beverage to be prepared.

13. The method according to claim 11, the machine further comprising a user interface for inputting the specific control input.

14. The method according to claim 1, further comprising forcing the coffee beans, which are received by grinder, towards the grinders into a gap delimited by the two grinding elements in order to grind these coffee beans.

15. The method according to claim 14, wherein the forcing of the coffee beans is carried out using a retaining element.

16. The method according to claim 15, wherein the retaining element is arranged such that the coffee beans are forced towards the grinder by gravitational force on the retaining element.

17. The method according to claim 1, wherein each of the one or more receptacles is connected to a respective one of the one or more dosing devices.

18. The method according to claim 1, wherein each of the one or more receptacles is a tight container.

19. The method according to claim 1, further comprising measuring, with a measuring unit, the amount of the coffee beans, which have been dispensed by the one or more dosing devices, and sending signals, with the measuring unit, indicative of the measured amount of the coffee beans dispensed.

20. The method according to claim 19, wherein the measuring unit measures a volume and/or weight and/or number of the coffee beans, dispensed by the one or more dosing devices.

21. The method according to claim 1, further comprising:
measuring, with a weighing unit, a weight of the ground coffee, which is ground and dispensed by the grinder, and
sending signals, with the weighing unit, indicative of the measured weight of received ground coffee.

22. The method according to claim 1, wherein the one or more receptacles comprise at least two receptacles, and wherein the method further comprises inputting a control input to a control unit configured to control the one or more dosing devices to dispense to the grinder a specific blend, comprising a specific ratio of coffee beans of one of the at least two receptacles to coffee beans of another of the at least two receptacles, based on the control input.

* * * * *